Jan. 12, 1971  W. C. BURT  3,553,901
SURFACE FINISHING MACHINE
Filed April 29, 1969  6 Sheets-Sheet 1
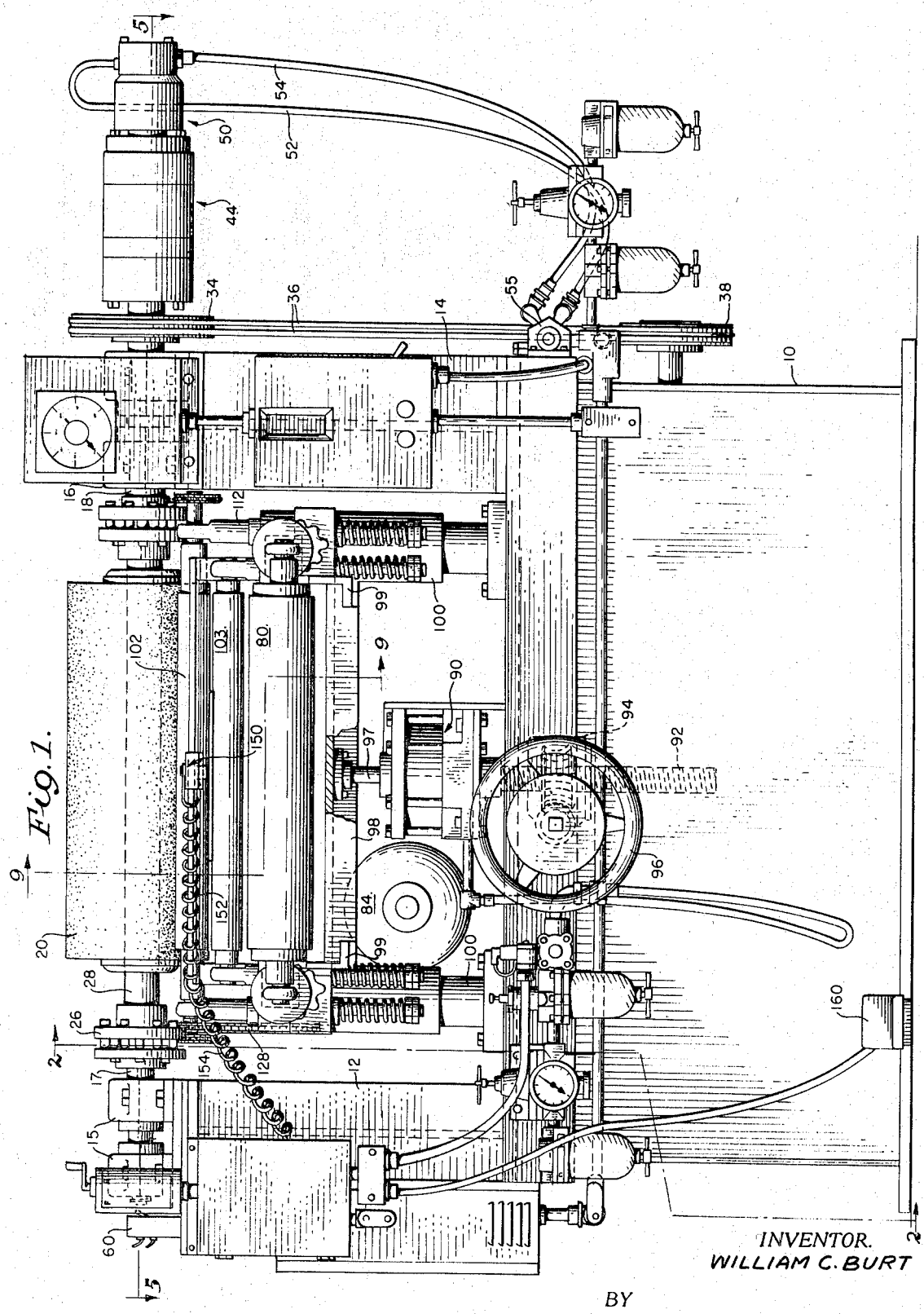
INVENTOR.
WILLIAM C. BURT
BY
Bean + Bean
ATTORNEYS

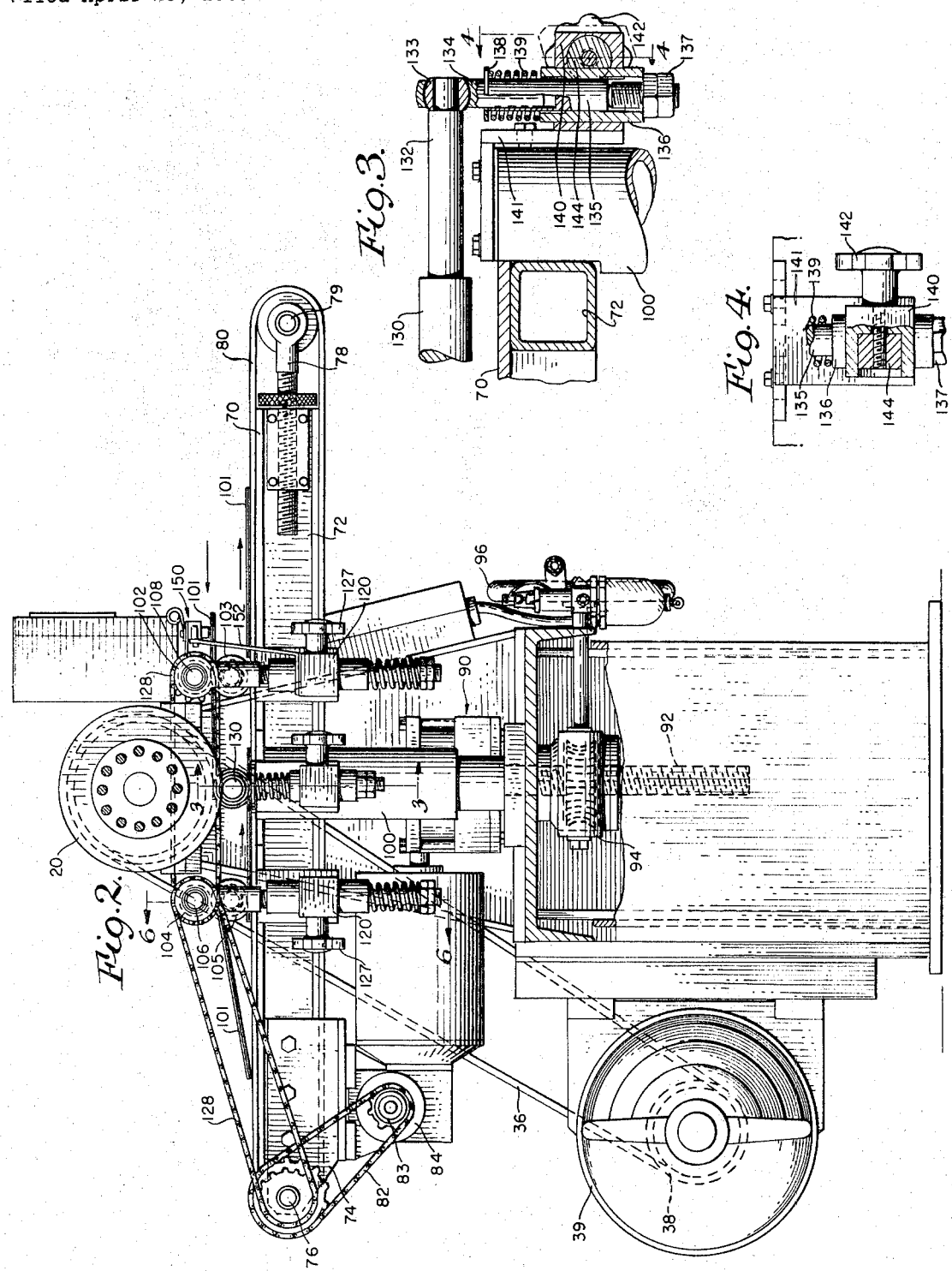

Jan. 12, 1971  W. C. BURT  3,553,901
SURFACE FINISHING MACHINE
Filed April 29, 1969  6 Sheets-Sheet 3
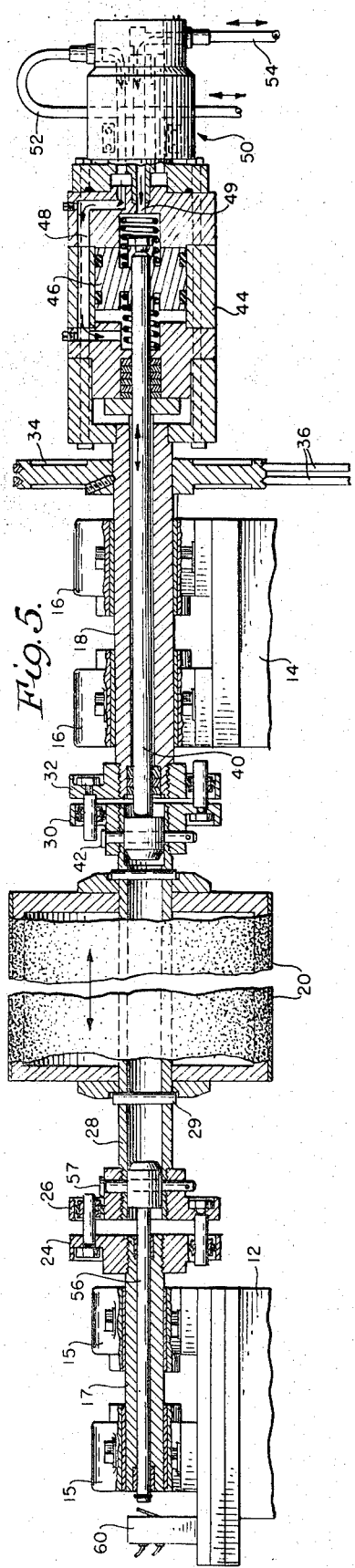
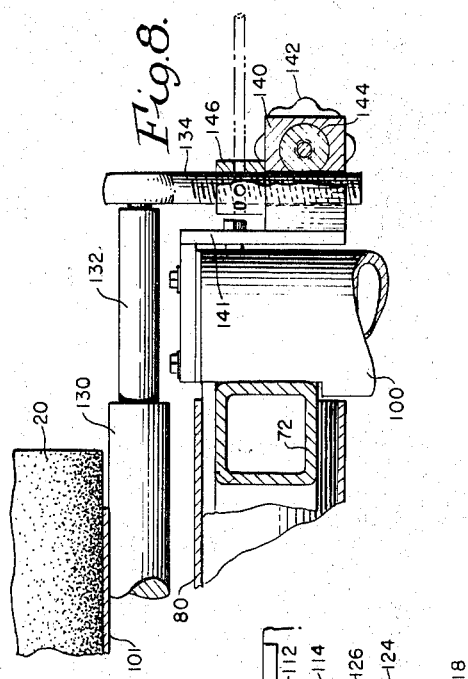
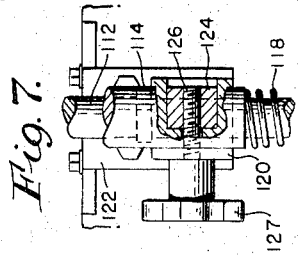
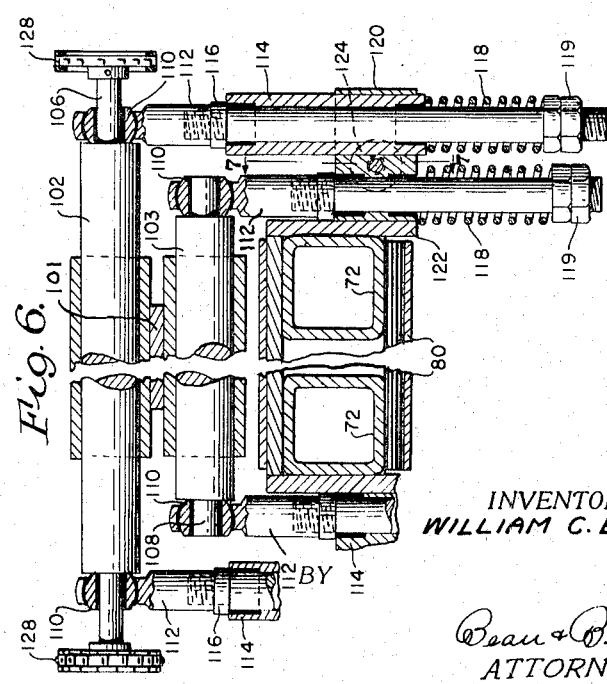
INVENTOR.
WILLIAM C. BURT
BY
Bean & Bean
ATTORNEYS Jan. 12, 1971  W. C. BURT  3,553,901
SURFACE FINISHING MACHINE
Filed April 29, 1969  6 Sheets-Sheet 4
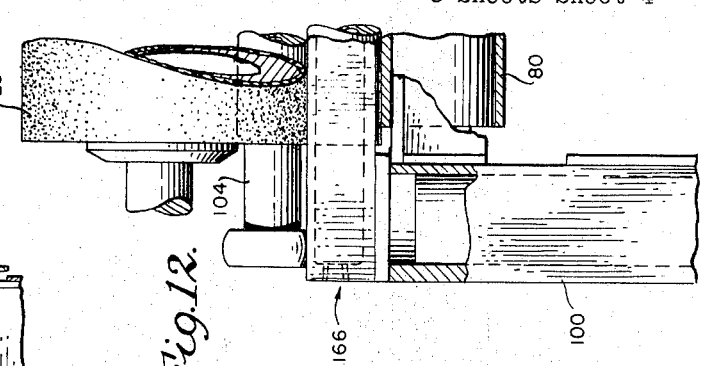
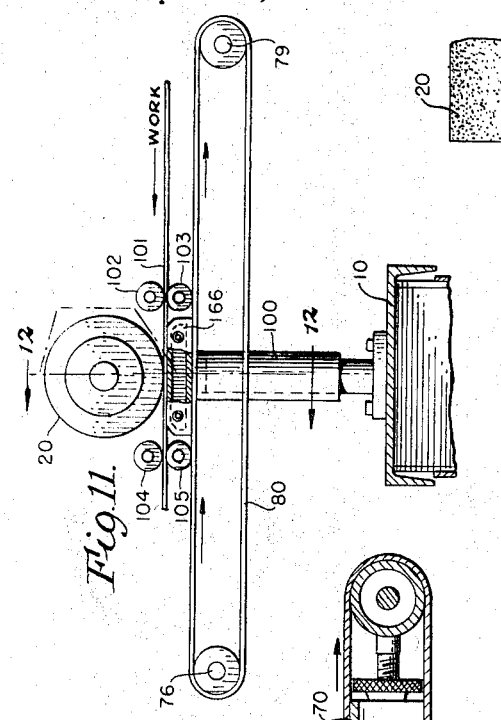
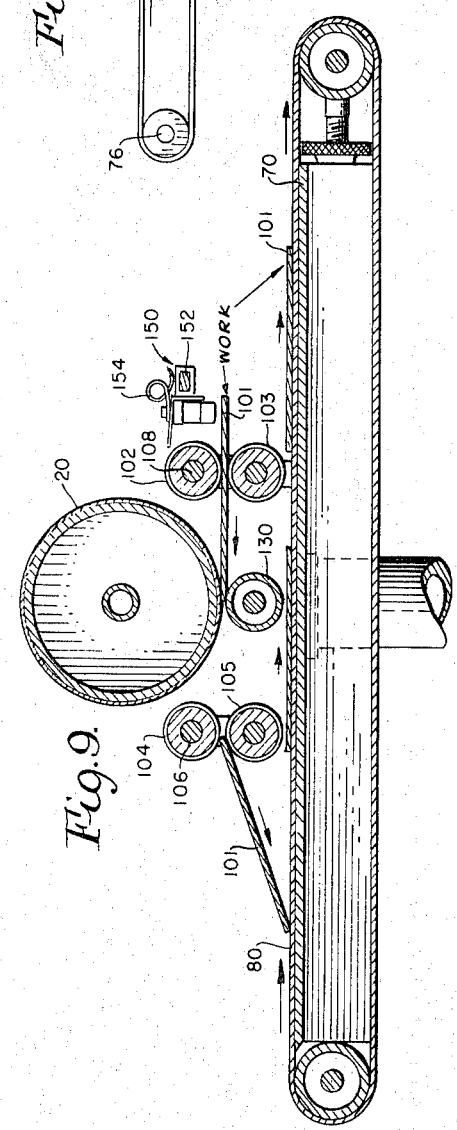
INVENTOR.
WILLIAM C. BURT
BY
*Bean & Bean*
ATTORNEYS

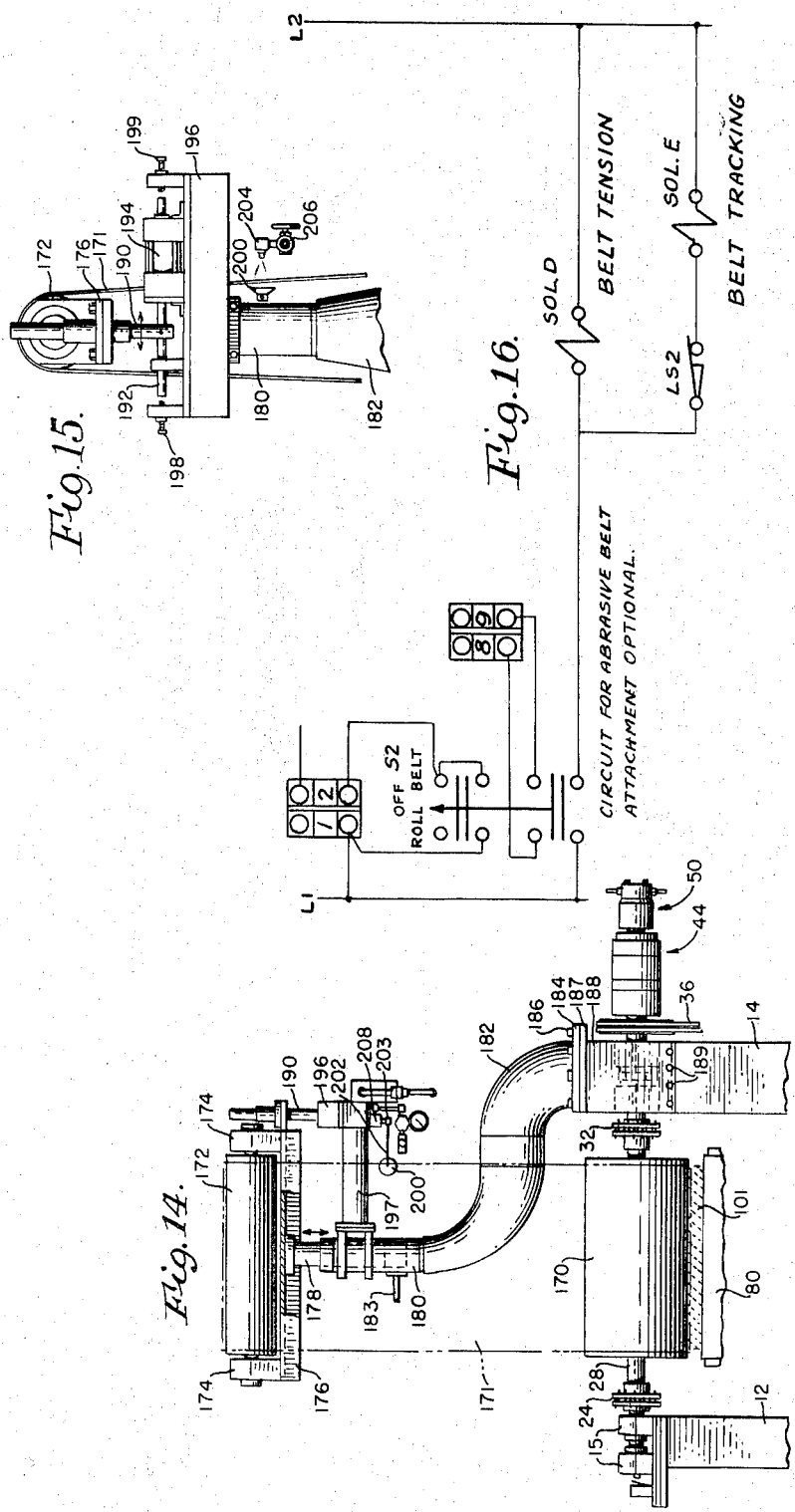

United States Patent Office 3,553,901
Patented Jan. 12, 1971

3,553,901
SURFACE FINISHING MACHINE
William C. Burt, Olean, N.Y., assignor to Clair
Manufacturing Co., Inc., Olean, N.Y.
Filed Apr. 29, 1969, Ser. No. 820,238
Int. Cl. B24b 21/00, 7/00
U.S. Cl. 51—142                                    14 Claims

ABSTRACT OF THE DISCLOSURE

An improved machine for roughing, cleaning, brushing, delustering, polishing, satin-finishing, glazing, buffing, waxing, or otherwise surface-processing cut-to-length sheets, plates, panels, strips, continuous coil, or other type workpieces. The invention features improvements in such machines facilitating their employment with enhanced versatility and adjustability to suit a large variety of workpiece processing requirements.

DESCRIPTION OF THE INVENTION

Figure 13:
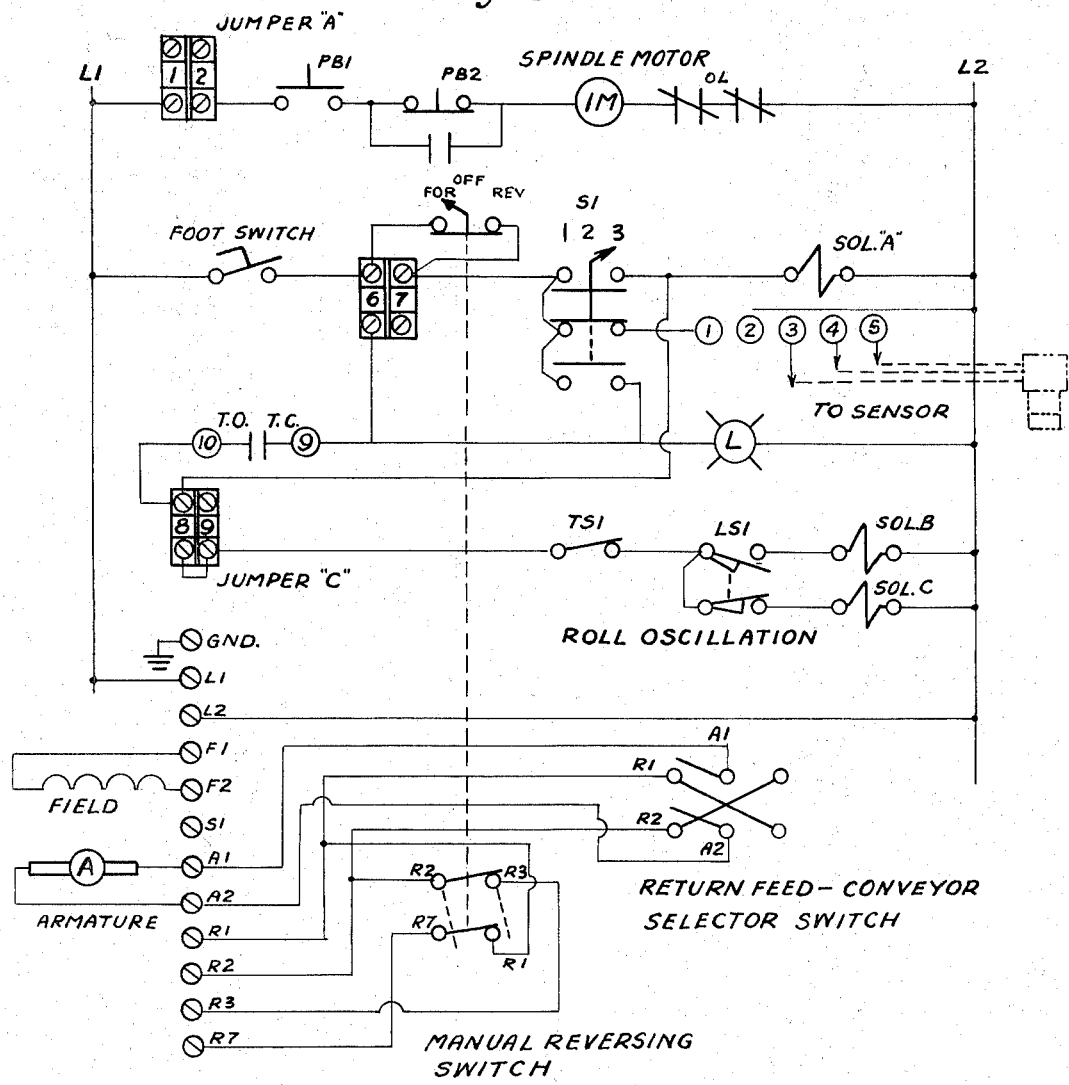

It is an object of this invention to provide an improved machine of the character described which includes a fixed elevation buffing or polishing or "processing" roll, and cooperable therewith a vertically adjustable table mounting an endless workpiece carrying conveyor for effecting the feeding of stockpieces through the machine, and in which the vertically movable table is biased vertically by air cylinder means so that the processing roll engages the work under predetermined uniform pressure conditions.

Another object of the invention is to provide in a machine as aforesaid an improved pinch roll means biased by spring devices to engage the workpieces in improved manner.

A further object of this invention is to provide an improved processing roll mounting and driving arrangement whereby the machine is readily accessible for processing roll exchange purposes and whereby the processing roll incorporates improved means for reciprocating the latter.

It is another object of the invention to provide a machine as aforesaid which is of improved versatility in that it can be readily arranged to finish a variety of thicknesses of workpieces.

Another object of the invention is to provide a machine as aforesaid which is adapted to operate with improved facility to finish flat workpieces from the leading edges to trailing edges thereof while avoiding undesirable pick-up of the workpieces by the processing roll and/or "scooting" of the workpieces through the machine.

Another object is to provide a machine as aforesaid which, without any reversing controls or the like, constantly accepts and processes and automatically delivers back to the machine attendant the workpieces as fast as they can be fed to the machine.

Other objects and advantages of the invention will appear in the specification hereinafter.

By way of illustration of one example of the present invention, a machine embodying the features thereof is illustrated in the accompanying drawings.

THE DRAWING

FIG. 1 is a front elevation of the machine according to the present invention;
FIG. 2 is a section taken on line 2—2 of FIG. 1;
FIG. 3 is an enlarged scale, fragmentary sectional view taken along line 3—3 of FIG. 2;
FIG. 4 is an enlarged scale, fragmentary sectional view taken along section line 4—4 of FIG. 3;
FIG. 5 is a fragmentary sectional view taken along the plane of section line 5—5 of FIG. 1;
FIG. 6 is an enlarged scale, fragmentary sectional view as indicated by section line 6—6 of FIG. 2;
FIG. 7 is a fragmentary sectional view taken on line 7—7 of FIG. 6;
FIG. 8 is a view corresponding to FIG. 3 but showing a modified form of workpiece backup pressure arrangement;
FIG. 9 is a sectional view taken on line 9—9 of FIG. 1 illustrating the workpiece transport system and one form of automatic control;
FIGS. 10, 11 are views corresponding to FIG. 9 showing modified forms of workpiece handling arrangements to which the machine may be readily adjusted;
FIG. 12 is an enlarged scale fragmentary sectional view taken as indicated by line 12—12 of FIG. 11;
FIG. 13 is a diagram of the electrical control system for the machine;
FIG. 14 is a fragmentary front elevational view of the machine showing mounted thereon an optional accessory attachment for an alternative mode of operation of the machine;
FIG. 15 is a diagram of the control system for the machine arrangement of FIG. 14; and
FIG. 16 is a schematic of an accessory control circuit portion of the machine.

DETAILED DESCRIPTION

As shown in the drawing herewith, the machine is constructed to include a base 10 supporting a pair of upright pedestals 12, 14, at its opposite sides. The pedestals 12, 14 mount paired bearing blocks 15—15 and 16—16, which blocks carry hollow horizontally disposed shafts 17, 18 (FIGS. 1, 5) for support of the processing roll 20 as will be explained hereinafter. The shafts 17–18 are mounted in end thrust bearings and are thus fixed against axial displacements in the bearing assemblies 15–16. The shaft 17 carries at its inner end a flexible coupling face plate 24; the opposite face plate 26 being keyed to the main spindle 28 which supports and drives the processing roll 20 by means of key pins or the like as indicated at 29 (FIG. 5). At its other end the spindle 28 carries a flexible coupling face plate 30, the opposite face plate 32 of which is carried by the stub shaft 18. A drive pulley as indicated at 34 is keyed to the shaft 18 for gearing connection as by means of V belts 36 to the machine drive motor pulley 38 (FIG. 1); the motor being shown at 39 (FIG. 2).

As shown in FIGS. 1 and 5, the parts are so dimensioned that the distance between the face plates carried by the spindle 28 is shorter than the space between the face plates 24, 32, whereby the processing roll may be axially reciprocated incidental to rotation thereof for producing a smoothly finished product. This reciprocation is attained by means of a push-pull rod 40 which extends through the hollow stub shaft 18 and connects at one end by means of a pin 42 to the face plate and spindle 28 which drives the roll 20. At its other end the push-pull rod 40 extends into a cylinder 44 which is carried by and rotates with stub shaft 18; the cylinder 44 having disposed therein a piston 46 to which the rod 40 is fixedly connected.

The cylinder 44 includes separate compressed air passageways 48, 49 which enter the cylinder through means of a rotary union 50 and connect therethrough with corresponding conduits 52, 54 which in turn lead to a solenoid controlled valve as indicated at 55 (FIG. 1). The valve 55 may be of any four-way standard valve type adapted to deliver air under pressure either to the conduit 52 or the conduit 54, depending upon adjustment of the valve armature as by means of solenoids indicated at A, B, (FIG. 13). A similar control rod 56 is disposed to extend through the hollow stub shaft 17 and is connected at one end by means of a pin 57 to the roll spindle 28 so as to reciprocate axially therewith. At its other end the rod 56 is arranged to abut the actuating lever of a push switch 60.

Thus it will be appreciated that reciprocation of the roll 20 in axial direction will be accompanied by equal reciprocation of the rod 56 relative to the switch 60, whereby the switch will alternately complete circuits to solenoids A and B, respectively. The solenoids A, B are oppositely directed so as to alternately displace the armature of the valve 55 in opposite directions; thereby causing the valve to deliver compressed air alternately through the conduits 52, 54 into the cylinder 44 at opposite ends of the piston 46 therein. Hence, the reciprocation control system functions automatically and without interference with the driving rotation of the roll 20.

Processing roll changes are conveniently effected simply by first removing the pins 57, 42 and then moving the left hand bearing block unit to the left relative to the pedestal 12 as viewed in FIGS. 1, 5. This disconnects the assembly at the flexible coupling 24, 26, whereupon the processing roll spindle may be similarly displaced toward the left to free it from the coupling face plate 32. Replacement of another processing roll thereon is effected by simply reversing the procedure.

The workpiece support and transport mechanism includes a table over which trains the upper strand of an endless conveyor belt which slides upon the top surface of the table and which in turn carries the workpieces to pass under the processing roll 20. As shown herein the table structure is fabricated to comprise a top plate 70 supported by tubular side rail members 72. At one end the table frame structure includes brackets 74 at opposite sides of the table and mounting the conveyor drive pulley shaft as indicated at 76. At the opposite end of the table and at opposite sides thereof screw thread adjustable arms 78 are provided to extend from the table structure to mount the conveyor idler pulley shaft 79. The conveyor belt is illustrated at 80 and the conveyor drive is shown to be provided by means of a chain and sprocket system 82, 83 geared to an electric motor 84.

The table structure is vertically supported by means of a centrally located pneumatic piston-cylinder unit as indicated generally at 90 (FIGS. 1, 2). The bottom end of the cylinder 90 is fitted with a downwardly extending screw threaded post 92 which is engaged by a nut-bearing 94 mounted on the base portion 10 of the machine. The threaded nut is driven by means of a worm gear carried by a hand wheel shaft 96, whereby it will be appreciated that manual rotation of the hand wheel 96 will cause the post 92 to raise or lower. The piston rod portion 97 of the unit (FIG. 1) extends upwardly into supporting connection with a cross bar 98 which is fixed at its opposite ends to the conveyor side rails 72—72, as by means of angles 99. Thus, it will be appreciated that operation of the piston relative to the cylinder 90 will either raise or lower the conveyor table; the vertical position of the cylinder, as adjusted manually by the hand wheel 96, determining the datum for the piston-cylinder operation. The table is stabilized throughout the range of its vertical adjustments by means of a pair of vertically standing telescopic bearing units 100—100 located at opposite sides of the table structure.

The machine of the invention features an improved workpiece transport mechanism shown herein to comprise two sets of vertically paired pinch rolls designated 102, 103 and 104, 105, respectively. The upper rolls 102, 104 are carried on corresponding spindles 106, 108 (FIG. 6). The spindles 106, 108 are journaled at their opposite ends within spherical bearing blocks as indicated at 110; the bearing blocks 110 being carried within the upper ends of corresponding struts 112. The struts 112 are telescopically carried within sleeves 114 and include shoulder portions 116 which are biased in each case toward bottomed position in the sleeve 114 as by means of a compression spring 118, the tension of which is readily adjustable as by means of a lock nut system 119. As shown, the sleeves 114 slidably extend vertically through support blocks 120 which are in turn welded or otherwise fixed to stirrup plates 122 carried by the side rail portions 72 of the conveyor table frame.

Thus the support blocks 120 are carried directly by the table frame, and the sleeves 114 are vertically slidable within the blocks 120. Locking devices are provided for fixing the sleeves 114 in any desired positions of vertical adjustment relative to the blocks 120. As shown herein (FIGS. 6, 7) the locking devices consist of pressure shoes 124 operated by machine screws 126 which when tightened by manual operation of handles 127 will hold the shoes 124 against the sleeves 114 in frictional engagement therewith so as to lock the sleeves against any movement relative to the blocks 120. Thus it will be appreciated that to suit the pinch rolls to accommodate workpieces of different thicknesses, the screws 126 will first be loosened and the sleeves 114 may then be suitably adjusted vertically relative to the blocks 120. The screws 126 will then be tightened, and the springs 118 will then supply the requisite resilient pressure forces for holding the workpiece firmly between the pinch rolls 102–103. The upper pinch rolls 102 are power driven by sprocket and chain devices as shown at 128 (FIG. 2) deriving power from the conveyor drive spindle 76; for transporting the workpieces through the machine. The parts are so arranged that the workpieces are thereby passed under the roll 20 for smooth and uniform finishing of the workpiece. This pressure applying arrangement insures against any accidental "scooting" of the workpiece through the machine under the impetus of the processing roll such as might otherwise occur, and at all times insures that the workpieces will be uniformly processed by the roll 20 through their entire surface areas.

As best shown at FIGS. 2, 3, 9, a back-up roll as indicated at 130 is carried by a spindle 132 and end bearings 133 at its opposite ends in upright posts 134 which are vertically slidable in sleeves 135 which are in turn telescopically carried within holders 136. At their lower ends the sleeves 135 are screw-threaded and carry lock nuts 137. Adjacent their upper ends the posts 134 are formed with shoulders 138 under which compression springs 139 are arranged so as to at all times bias the posts upwardly within the limits imposed by the settings of the lock nuts 137 at the lower ends of the posts. The holders 136 are carried by brackets 140 and arms 141 extending from the conveyor frame post 100; and manual lock screws 142 carrying cam blocks 144 are provided for normally locking the sleeves 135 in the desired vertically adjusted positions.

Hence, the back-up roll 130 is biased by the springs 138 upwardly towards the roll 20, whereby whenever a workpiece as indicated at 101 is being transported through the machine by the pinch rolls it will be "backed-up" by the roll 130 against the working peripheral portion of the processing roll 20 so as to receive therefrom a uniform processing throughout the entire surface of the workpiece, and at the prescribed pressure relationship therebetween. FIG. 8 corresponds to FIG. 3 but illustrates another form of mounting for the back-up roll carrying posts 134—134 relative to their holders 136—136. In this case the posts 134 are screw threaded and fitted with nuts 146 resting on top of the brackets 140. Thus, the nuts 146 may be vertically adjusted on the posts 134, as by means of a turn bar or the like, to the desired elevation whereupon they will function as pillow blocks firmly holding the back-up roll against the under surface of the workpiece as it travels through the machine.

As illustrated at 150 (FIGS. 1, 2, 9, 10, 13) a proximity type sensor is mounted as by means of a support bar 152 so as to be disposed just ahead of the feed-in gap between the pinch rolls 102, 103, and is operably connected as indicated at 154 through a time delay relay device to a solenoid operated valve 155. The valve 155 controls alternate applications of compressed air to opposite sides of the piston in the cylinder 90; thereby alternately raising and lowering the conveyorized table and the back-up roll 130 and the transport pinch roll system, relative to the processing roll 20. The sensor and cylinder control system is so arranged that when no workpiece is disposed in the machine the conveyorized table is retracted downwardly, but whenever a workpiece is fed into the gap between the pinch rolls 102, 103, the sensor initiates a suitably time-delayed delivery of compressed air to the cylinder 90 so as to cause the workpiece to be elevated into processing contact relation with the roll 20 at the instant when the leading edge of the workpiece moves into vertical alignment with the bottom edge of the processing roll. The system is then maintained at this elevation in uniformly pressured relation against the roll until such time as the workpiece leaves the roll. However, as the trailing edge of the workpiece moves past the sensor 150 the latter furnishes a similarly time-delayed signal to the solenoid controlling the cylinder valve in such manner that coincident with passage of the trailing edge of the workpiece from the roll to the conveyorized table automatically lowers relative to the roll. Hence, the processing roll makes no brushing contacts with anything except the workpieces as they pass through the machine.

It is a particular feature of the machine set up as shown at FIGS. 1, 2, 9, that worksheets may be fed into the machine in the direction best shown in FIGS. 2, 9, whereupon they will be pulled through the processing gap by the pinch roller system; and then will drop down from the pinch roll 105 at the rear of the machine upon the belt 80 whereupon they are immediately picked up automatically by the belt and shunted in reverse direction under the back-up roll 130 and back to the machine attendant. The operator may then either refeed the worksheet (where multiple passes are required) or simply unload it while alternating each unloading operation with a fresh sheet loading operation. Thus, without any reversing of the belt or other attention by the operator the machine constantly accepts and processes and delivers back to the operator the workpieces as fast as they can be fed to the machine.

As shown at FIGS. 1, 13, the table lift cylinder 90 may be operator-controlled in lieu of sensor controlled as explained hereinabove as by means of a foot treadle switch 160; the compressed air supply system being arranged so that whenever the operator steps on the treadle the table rises so that the workpieces will come into bearing contact with the processing roll. However, in any case it is the resilient air pressure force exerted by the force exerted by the cylinder 90 that operates to maintain the workpiece in uniformly pressured relation against the processing roll as the workpiece is transported relative thereto. Upon completion of a processing operation the operator steps off the control pedal and the table thereupon lowers, thus avoiding undesirable wearing contacts between the processing roll and the conveyor belt or parts of the machine.

FIG. 10 of the drawing herewith illustrates a modified form of machine set up and operation which is readily available in accordance with the invention. In this case the upper pinch rolls 102, 104 and the back-up roll 130 are removed and the conveyor belt 80 is employed to support and transport the workpieces through the machine in processing contact relation with the roll 20.

Thus it will be appreciated that a workpiece such as indicated at 101 may be placed upon the top strand of the conveyor belt 80 whereby it will be driven to pass under the roll 20, either in the manner of a single pass or repeated straight line passes, or reciprocally back and forth under the process roll, as may be preferred. The automatic sensor-controlled system 150 may be employed if desired. Depending upon the thickness of the workpiece to be processed, the hand wheel 96 will first be adjusted so that when compressed air is delivered to the cylinder the piston thereof will extend the table upwardly so as to press the workpiece against the process roll with the desired degree of pressure. Thus, although the table will be "mechanically" adjusted vertically in the first place to different workpiece thicknesses after the initial adjustment the working pressure against the processing roll will be determined and maintained by the air pressure within the cylinder 90. Inasmuch as this is of resilient nature a substantially uniform pressure will be exerted between the processing roll and the workpiece throughout the entire extent of the workpiece processing operation.

FIGS. 11, 12, illustrate still another readily available modification of the machine set up and operation wherein a flat shoe as indicated at 166 is mounted to span the space between the support posts 100-100 above the upper strand of the conveyor belt 80, and the pinch rolls 103-103 are arranged to now ride directly on the conveyor belt 80, and are thereby frictionally driven to rotate therewith. The shoe 166 vertically dimensioned so that its top surface is substantially level with the top levels of the rollers 103-105. Thus workpieces as indicated at 101 may now be fed to the processing roller through the gap between the roller and the shoe. Because the upper rolls 102, 104 are spring-biased downwardly they hold the workpieces in snug driving relationship with the rolls 103, 105. Thus it will be appreciated that workpieces may be fed through the gaps between the paired pinch rollers and between the shoe 166 and the processing roll 20; the pinch rolls cooperating to transport the workpieces through the machine as it is processed by the roll 20. The shoe 166 may be water-cooled if desired.

As illustrated at FIG. 14, the machine of this invention is readily convertible to an abrasive belt mounting the driving arrangement; whereby the parts are readily accessible for changeover purposes, and whereby the machine is of improved versatility in that it can be readily rearranged to convert it in only a few minutes time from a multipurpose surface finishing machine to a variable oscillating abrasive belt machine.

To convert the machine to an abrasive belt grinder or polisher or the like, the buffing roll 20 is simply removed from between the bearing blocks 15, 16 as explained hereinabove for roll change purposes; and in lieu thereof a drum 170 is mounted between the flexible couplings by means of the drive shaft 28 and an abrasive belt as indicated at 171 is arranged to train around and under the drum 170. To support the upper end of the abrasive belt 171 an idler roll 172 is mounted by means of bearing blocks 174, 174 carried by a platform 176 which extends transversely between the belt strands just below the idler roll 172. The platform 176 is centrally supported by means of a post as indicated at 178; the post 178 being freely rotatable about its vertical axis and vertically slidable as in the manner of a piston within a socketed pedestal 180 extending vertically from an S-shaped support arm 182.

A compressed air supply conduit as indicated at 183 connects into the chamber under the piston-post 178 for control of its upward thrust, and hence the tension on the abrasive belt. The arm 182 includes a bottom flange 184 which bolts as indicated at 186 to the top plate portion 187 of a bracket 188 which detachably mounts by means of machine screws 189 to form a vertical extension of the machine pedestal 14. Thus, the idler roll 172 supporting the upper end of the abrasive belt 171 is supported to be generally parallel to the bottom drum 170 while being swivable about the vertical axis of the support post 178.

To cause the abrasive belt 171 to reciprocate on the drum 170 in directions axially thereof, provision is made for oscillating the idler roll support platform about its vertical support axis. For this purpose the platform 176 is provided with a lateral extension supporting a downwardly extending pin 190 which pivotally connects to the piston rod 192 of an air cylinder 194 which is mounted by means of a beam 196 on an arm 197 extending from the stationary support pedestal 180. Thus, it will be understood that reciprocations of the piston rod 192 relative to the cylinder 194 along a path substantially parallel to workpiece movement will cause the idler control pin 190 to be similarly displaced so as to oscillate the idler roll support about the vertical axis of the post 178. Adjustable stop devices as indicated at 199, 199 are preferably employed at opposite ends of the piston travel path, to limit the travel of the idler roll, and the speed of reciprocation of the idler roll.

To control the cylinder 194 a belt tracking detector device is provided, which for example may be as shown in the drawing herewith to comprise a cup-shaped baffle 200 carried at one end of arm 202 which is pivotally mounted as indicated at 203 upon the stationary beam 196. The pivot device 203 includes a spring (not shown) operable to urge the arm and baffle unit toward the position thereof shown in FIG. 15. The parts are so dimensioned and arranged that when the baffle 200 stands in the position thereof shown in FIG. 15 it is shielded behind the abrasive belt 171, provided that the latter is then tracking on its rollers at that side of its prescribed oscillating tracking path. A pneumatic jet device as indicated at 204 supplied by a compressed air supply conduit 206 is arranged in such manner that the jet blast is directed toward the baffle 200, as shown in FIG. 15.

However, whenever the abrasive belt 171 tracks over so that the edge of the belt shields the baffle 200 from the air jet, the pivot spring action then moves the baffle arm 202 to the position thereof as shown in FIG. 15. This actuates a two-way control switch 208 for delivering air under pressure to one end or the other of the cylinder 194, thereby shifting the piston rod unit thereof so as to swing the idler roll carriage about its vertical axis. This canting of the idler roll causes the abrasive belt to shift its tracking path, both on the drum 170 and on the idler roll 172, and in such manner that the shielding edge portion of the abrasive belt moves away from masking position relative to the baffle 200. The parts are so dimensioned and arranged that when the belt has reached the desired alternative tracking path, the baffle 200 is uncovered and the air blast from the nozzle 204 operates to swing the baffle arm back to its position as shown in FIG. 14. This causes the switch mechanism 208 to operate so as to now direct compressed air into the opposite end of the cylinder 194, whereby the piston rod unit is propelled to cause the idler carriage to swing back again in the opposite direction.

Thus, it will be appreciated that the mechanism will automatically provide for back and forth oscillations of the idler roll carriage about its vertical support axis, which in turn will induce corresponding tracking oscillations of the abrasive belt 171 on the drum 170 in directions axially thereof. Thus, the abrasive belt media reciprocates laterally relative to the workpiece which is being processed so as to prevent formation of "graining" or scratching or other unevenly abraded appearances on the surface of the finished workpiece.

I claim:

1. A workpiece surface finishing machine comprising a base and a pair of laterally spaced apart upright pedestals fixed to said base and having bearing blocks carried by said pedestals,
   axially aligned stub shafts carried by and rotatably journalled in each of said bearing blocks,
   a work shaft disposed in axial alignment between said stub shafts and mounting a processing roll, and having flexible couplings connecting the opposite ends of said work shaft and said stub shafts providing axial lost-motion interconnections therebetween,
   a workpiece support table disposed between said pedestals, and pneumatic piston-cylinder means providing vertical support for said table and operable to vertically bias and displace the latter,
   guide means operable to stabilize said table to maintain a constantly horizontal attitude while moving vertically,
   an endless conveyor belt carried by said table and having the upper strand of said belt supported by and traveling over the top surface of said table,
   first power means driving said processing roll, and second power means driving said conveyor belt,
   workpiece transport means comprising pinch rollers disposed transversely of and above said conveyor belt at opposite sides of said processing roll and a back-up roller disposed beneath said processing roll, said rollers being rotatably supported at their opposite ends by bearing means,
   one of said power means being geared indirectly to at least one of said pinch rollers for driving the latter,
   strut means engaging said bearing means at opposite ends of said pinch rollers and operable to bias said rollers into firm riding relation against a workpiece when passing through the machine, whereby a workpiece may be carried thereby to pass in process-bearing relation against said processing roll,
   and means providing axial reciprocating movements of said processing roll relative to said table.

2. A workpiece surface finishing machine as set forth in claim 1 wherein said workpiece support table also carries in vertically adjustable relation thereon a workpiece back-up roll disposed in opposition to said processing roll transversely of the path of travel of a workpiece when being carried through the machine by said pinch rollers.

3. A workpiece surface finishing machine as set forth in claim 1 wherein said workpiece back-up roller is disposed above said conveyor belt and in spaced opposition to said processing roll to provide vertical support for said workpiece when passing in processing relation below said processing roll, and wherein said upper strand of said conveyor belt is driven to travel in a direction opposite to the direction of travel of a workpiece when being carried through said machine by said pinch rollers.

4. A workpiece surface finishing machine as set forth in claim 1 wherein at least one of said pinch rollers is driven from said second power means.

5. A workpiece surface finishing machine as set forth in claim 1 wherein at least one of said pinch rollers is driven to rotate by means of frictional contact with said upper strand of said conveyor belt.

6. A workpiece surface finishing machine as set forth in claim 1 wherein said piston-cylinder means providing vertical support for said table is positionally adjustable vertically relative to the machine base by a manual control means.

7. A workpiece surface finishing machine as set forth in claim 1 wherein said strut means carrying said pinch rollers are positionally adjustable, separately in vertical directions to suit the machine to process workpieces of different thicknesses.

8. A workpiece surface finishing machine as set forth in claim 1 wherein said means providing axial reciprocating movements of said processing roll relative to said table comprises; a piston coupled to said work shaft; a cylinder enclosing said piston and axially fixed relative to the machine; a valve controlling applications of fluid pressure in said cylinder alternately at opposite ends of said piston; and automatic reciprocation control means actuating said valve in response to reciprocating movements of said processing roll, so as to cause said processing roll to be axially reciprocated while in workpiece contacting position.

9. A workpiece surface finishing machine as set forth in claim 2 wherein said back-up roll is vertically adjustable on said support table to suit the machine to process workpieces of different thicknesses.

10. A workpiece surface finishing machine as set forth in claim 1 wherein said pneumatic piston-cylinder means is automatically controlled by a sensor device disposed adjacent the path of workpiece travel to cause said support table to retract downwardly away from the processing roll when no workpiece is being transported through the machine.

11. A workpiece surface finishing machine as set forth in claim 10 wherein said sensor device controls in time-delayed relation a valve controlling alternate application of air pressures at opposite sides of the piston in the piston cylinder unit.

12. A workpiece surface finishing machine as set forth in claim 1 wherein one of said pedestals includes connection means having attached thereto an upstanding post member carrying at its upper end a tracking roller disposed in vertically spaced parallel relation to said work shaft, and a drive roller mounted on said work shaft in lieu of a processing roll and an endless abrasive belt trained about said drive roller and said tracking roller operable to submit workpieces carried by said support table to abrasive belt finishing processes.

13. A workpiece surface finishing machine as set forth in claim 12 wherein said upstanding post member is of vertically extensible form and includes a fluid pressure cylinder-piston unit operable to bias said tracking roller upwardly for regulating the tension on the abrasive belt.

14. A workpiece surface finishing machine as set forth in claim 13 wherein said tracking roller is carried by said upstanding post so as to be rotatable about a vertical axis, and wherein means automatically responsive to mistracking travelling of the abrasive belt relative to the drive roller are provided to cause said tracking roller to rotate about said axis, thereby correcting any mistracking travelling of the belt.

References Cited
UNITED STATES PATENTS

| | | | |
|---|---|---|---|
| 3,126,674 | 3/1964 | Burt | 51—39 |
| 2,597,256 | 5/1952 | Murray | 51—142 |
| 3,136,096 | 6/1964 | Hine | 51—142 |

WILLIAM R. ARMSTRONG, Primary Examiner

U.S. Cl. X.R.

51—142, 148